(12) United States Patent
Liu et al.

(10) Patent No.: US 10,270,758 B2
(45) Date of Patent: Apr. 23, 2019

(54) LOGIN METHOD, SERVER, AND LOGIN SYSTEM

(71) Applicant: Tencent Technology (Shenzhen) Company Limited, Shenzhen (CN)

(72) Inventors: Mengqiao Liu, Shenzhen (CN); Shanyou Zhang, Shenzhen (CN); Yuebo Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 151 days.

(21) Appl. No.: 15/462,521

(22) Filed: Mar. 17, 2017

(65) Prior Publication Data
US 2017/0195311 A1   Jul. 6, 2017

Related U.S. Application Data

(63) Continuation of application No. PCT/CN2016/078565, filed on Apr. 6, 2016.

(30) Foreign Application Priority Data

Apr. 21, 2015   (CN) .......................... 2015 1 0191252

(51) Int. Cl.
*H04L 29/06* (2006.01)
*G06F 21/60* (2013.01)
(Continued)

(52) U.S. Cl.
CPC ............ *H04L 63/083* (2013.01); *G06F 21/35* (2013.01); *G06F 21/36* (2013.01); *G06F 21/602* (2013.01);
(Continued)

(58) Field of Classification Search
CPC ....... H04L 63/083; H04L 63/06; H04L 63/10; H04L 67/42; G06F 21/35; G06F 21/602; G06K 7/1417; G06K 19/10
See application file for complete search history.

(56) References Cited

U.S. PATENT DOCUMENTS 6,088,451 A * 7/2000 He ......................... H04L 63/20
380/255
2004/0054779 A1* 3/2004 Takeshima .............. H04L 29/06
709/225

(Continued)

OTHER PUBLICATIONS

Lee et al., Easy Authentication Using Smart Phones and 2-D Barcodes, Jan. 2011, IEEE International Conference on Consumer Electronics, pp. 139-140 (Year: 2011).*

*Primary Examiner* — Kenneth W Chang
(74) *Attorney, Agent, or Firm* — Brinks Gilson & Lione

(57) ABSTRACT

A login method is disclosed, including: receiving, by a first server, a login request of a first terminal; generating, by the first server, a unique identifier according to the login request, storing the unique identifier, generating a corresponding two-dimensional code according to the unique identifier, and returning the corresponding two-dimensional code to the first terminal, the two-dimensional code including the unique identifier; receiving, by a second server, the unique identifier that is obtained by a second terminal by scanning the corresponding two-dimensional code and a user name that has been used by the second terminal for logging in to an application, and sending the unique identifier and the user name to the first server; performing, by the first server, identity verification of the second server, and binding, by the first server, the stored unique identifier to the user name when the identity verification of the second server succeeds, to implement login to the first terminal by using the user (Continued)

name; or rejecting, by the first server, the login request when the identity verification of the second server fails.

15 Claims, 15 Drawing Sheets

(51) Int. Cl.
G06K 7/14 (2006.01)
G06K 19/10 (2006.01)
H04W 12/08 (2009.01)
G06F 21/35 (2013.01)
G06F 21/36 (2013.01)
H04W 12/06 (2009.01)

(52) U.S. Cl.
CPC ........... *G06K 7/1417* (2013.01); *G06K 19/10* (2013.01); *H04L 63/06* (2013.01); *H04L 63/10* (2013.01); *H04L 67/42* (2013.01); *H04W 12/06* (2013.01); *H04W 12/08* (2013.01); *G06F 2221/2107* (2013.01); *H04L 63/18* (2013.01)

(56) References Cited

U.S. PATENT DOCUMENTS

| | | | | |
|---|---|---|---|---|
| 2012/0096067 | A1* | 4/2012 | Murai | G06F 13/385 709/203 |
| 2013/0254858 | A1* | 9/2013 | Giardina | G06F 21/42 726/7 |
| 2014/0033286 | A1* | 1/2014 | Zhang | H04L 63/083 726/7 |
| 2014/0219495 | A1* | 8/2014 | Hua | H04L 67/02 382/100 |
| 2014/0237563 | A1* | 8/2014 | Zhang | H04L 63/083 726/5 |
| 2014/0289508 | A1* | 9/2014 | Wang | H04L 63/0853 713/155 |
| 2014/0325628 | A1* | 10/2014 | Huang | H04L 63/0853 726/7 |
| 2014/0359713 | A1* | 12/2014 | Ren | H04L 63/08 726/4 |

* cited by examiner

LOGIN METHOD, SERVER, AND LOGIN SYSTEM

RELATED APPLICATION

This application is a continuation application of PCT Patent Application No. PCT/CN2016/078565, filed on Apr. 6, 2016, which claims priority to Chinese Patent Application No. 201510191252.1, filed with the Chinese Patent Office on Apr. 21, 2015, both of which are incorporated herein by reference in their entireties.

FIELD OF THE TECHNOLOGY

The present disclosure relates to the field of computer technologies, and in particular, to a login method, a server, and a login system.

BACKGROUND OF THE DISCLOSURE

With development of Internet technologies, it has become one part of people's lives to access various resources by using networks for entertainment, study, and work. Usually, resources can be accessed only after login and verification of permissions.

In a conventional login method, a terminal always directly submits a login request to a server, and the terminal invokes a login interface to perform login. Identity verification has not been performed on the terminal that submits the login request. Therefore, security is relatively low.

SUMMARY

Based on the above, it is necessary to provide a login method, a server, and a login system for solving the foregoing problem, so as to improve login security. A login method includes:

receiving, by a first server, a login request of a first terminal;

generating, by the first server, a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;

receiving, by the first server, the unique identifier and a user name sent by a second server, wherein the second server receives the unique identifier that is obtained by a second terminal by scanning the corresponding two-dimensional code and the user name has been used by the second terminal for logging in to an application;

performing, by the first server, identity verification of the second server;

when the identity verification of the second server succeeds, binding, by the first server, the unique identifier stored on the first server to the user name to implement login to the first terminal by using the user name; and when the identity verification of the second server fails, rejecting, by the first server, the login request.

A first server comprising:
a memory storing instructions;
at least one processor in communication with the memory, wherein, when the instructions are executed by the at least one processor, the at least one processor is configured to cause the first server to perform:
receiving a login request of a first terminal;
generating a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;
receiving the unique identifier and a user name sent by a second server, wherein the unique identifier is obtained by scanning the corresponding two-dimensional code by a second terminal and the user name has been used by the second terminal for logging in to an application;
performing identity verification of the second server;
when the identity verification of the second server succeeds, binding the unique identifier stored in the first server to the user name to implement login to the first terminal by using the user name; and
when the identity verification of the second server fails, rejecting the login request.

A login system includes:
a first server, comprising:
a first memory storing first instructions, and
first at least one processor in communication with the first memory, wherein, when the first at least one processor executes the first instructions, the first at least one processor is configured to cause the first server to:
receive a login request of a first terminal, generate a unique identifier according to the login request, store the unique identifier, generate a corresponding two-dimensional code according to the unique identifier, and return the corresponding two-dimensional code to the first terminal, the corresponding two-dimensional code comprising the unique identifier; and
a second server, comprising:
a second memory storing second instructions, and
second at least one processor in communication with the second memory, wherein, when the second at least one processor executes the second instructions, the second at least one processor is configured to cause the second server to: receive the unique identifier that is obtained by a second terminal by scanning the corresponding two-dimensional code and a user name that has been used by the second terminal for logging in to an application, and send the unique identifier and the user name to the first server,
wherein when the first at least one processor executes the first instructions, the first at least one processor is configured to further cause the first server to:
perform identity verification of the second server,
when the identity verification of the second server succeeds, bind the unique identifier stored in the first server to the user name to implement login to the first terminal by using the user name, and
when the identity verification of the second server fails, reject the login request.

Details about one or more embodiments of the present invention are described in the following accompanying drawings and descriptions. Other features, objectives, and advantages of the present disclosure become obvious according to this specification, the accompanying drawings, and claims.

BRIEF DESCRIPTION OF THE DRAWINGS

To describe the technical solutions in embodiments of the present invention or in the existing technology more clearly, the following briefly introduces the accompanying drawings

DESCRIPTION OF EMBODIMENTS

Figure 1:
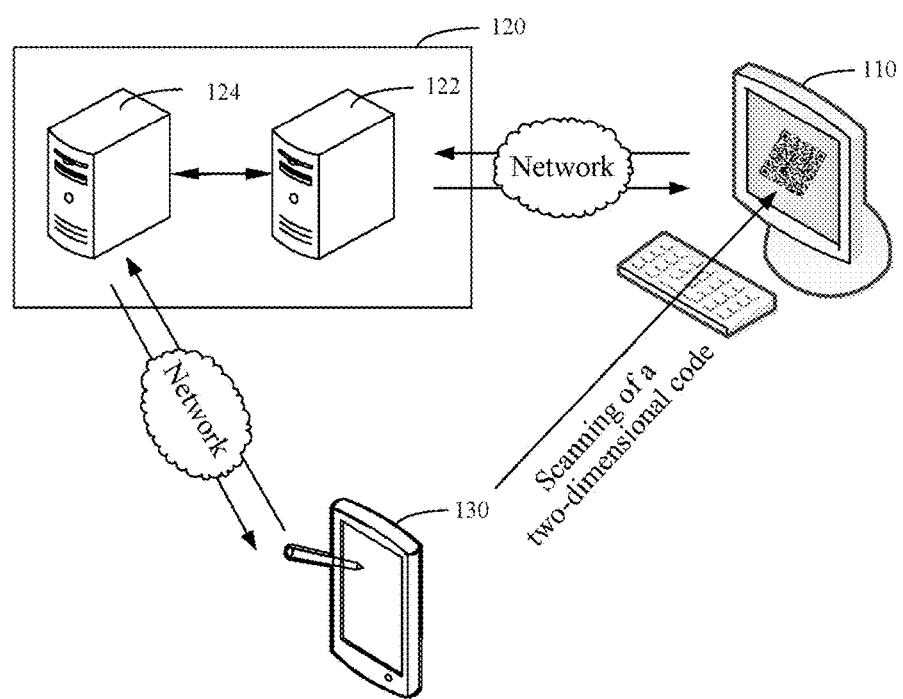
FIG. 1 is a diagram of an application environment in which a login method is operated according to an embodiment.

FIG. 1 is a diagram of an application environment in which a login method is operated according to an embodiment. As shown in FIG. 1, the application environment includes a terminal 110, a server 120, and a terminal 130. Both the terminal 110 and the terminal 130 can communicate with the server 120 by using a network.

The terminal 110 may be a smartphone, a tablet computer, a notebook computer, a desktop computer, or the like, but is not limited thereto. The terminal 130 may be various mobile devices having a two-dimensional code scanning function, such as a smartphone and a tablet computer, but is not limited thereto. The server 120 includes a first server 122 and a second server 124. The first server 122 may include multiple servers, where each server completes a related step of the login method. The terminal 110 may send a login request to the first server 122. The first server 122 generates a unique identifier according to the login request, stores the unique identifier, generates a two-dimensional code including the unique identifier, and returns the two-dimensional code to the terminal 110. The terminal 130 scans the two-dimensional code displayed on the terminal 110, to obtain the unique identifier, and sends the unique identifier and a user name that has been used for logging in to an application to the second server 124. The second server 124 forwards the unique identifier and the user name to the first server 122. The first server 122 performs identity verification of the second server 124. If the identity verification of the second server 124 succeeds, the first server 122 binds the stored unique identifier to the user name. When finds the user name in a binding relationship with the unique identifier, the terminal 110 receives the user name sent by the first server 122, and implements login by using the user name. If the identity verification of the second server 124 fails, the login request is rejected, and login cannot be performed.

Figure 2:
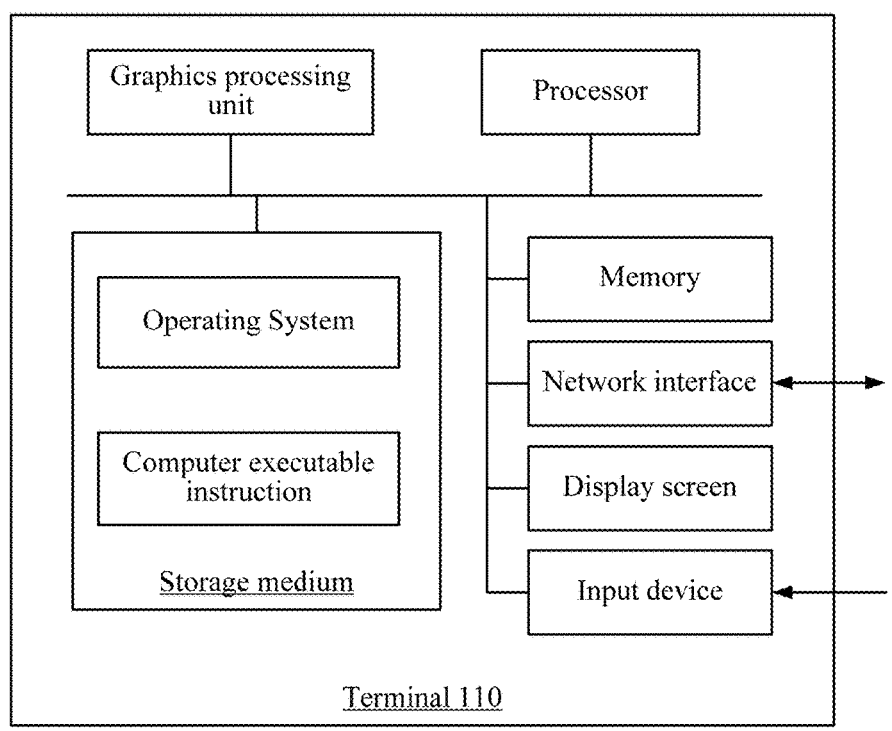
FIG. 2 is an inner structural diagram of a terminal in FIG. 1 according to an embodiment.

In an embodiment, an inner structure of the terminal 110 in FIG. 1 is shown in FIG. 2. The terminal 110 includes: a processor, a graphics processing unit, a storage medium, a memory, a network interface, a display screen, and an input device that are connected to each other by using a system bus. The storage medium of the terminal 110 stores an operating system, and further includes a computer executable instruction. When the instruction is executed by a CPU, a login method can be implemented. The processor is configured to provide a computing capability and a control capability, so as to support operation of the entire terminal 110. The graphics processing unit in the terminal 110 is configured to provide at least a drawing capability of a display interface. The memory provides an environment for operation of the computer executable instruction in the storage medium. The network interface is configured to perform network communication with the server 120, for example, send a login request and a query request to the server 120, or receive a two-dimensional code and a user name that are returned by the server 120. The display screen is configured to display a web page interface, for example, display a two-dimensional code in the web page interface. The input device is configured to receive a command, data, or the like input by a user. For the terminal 110 having a touchscreen, the display screen and the input device may be the touchscreen.

Figure 3:
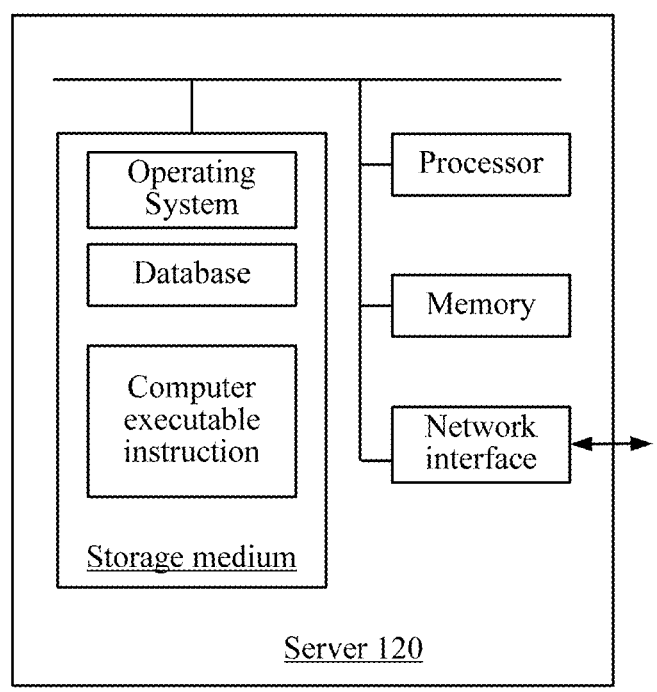
FIG. 3 is an inner structural diagram of a server in FIG. 1 according to an embodiment.

In an embodiment, an inner structure of the server 120 in FIG. 1 is shown in FIG. 3. The server 120 includes a processor, a storage medium, a memory, and a network interface that are connected to each other by using a system bus. The storage medium of the server 120 stores an operating system, a database, and a computer executable instruction. The database stores a unique identifier and a user name. When the instruction is executed by a CPU, a login method applicable to the server 120 can be implemented. The processor of the server 120 is configured to provide a computing capability and a control capability, so as to support operation of the entire server 120. The memory of the server 120 provides an environment for operation of the computer executable instruction in the storage medium. The network interface of the server 120 is configured to perform network connection and communication with the external terminal 110 and terminal 130, for example, to receive requests sent by the terminal 110 and the terminal 130, and return data to the terminal 110 and the terminal 130.

Figure 4:
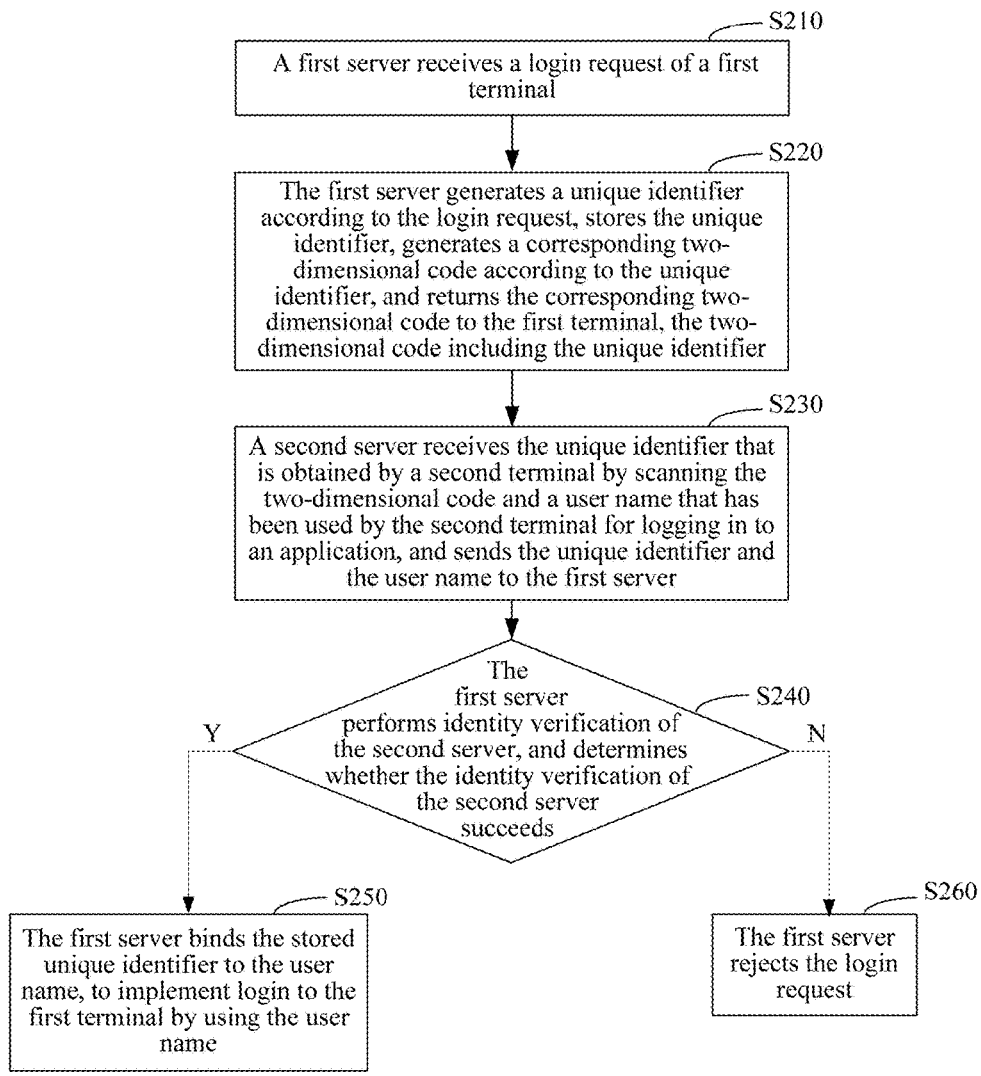
FIG. 4 is a flowchart of a login method according to an embodiment.

As shown in FIG. 4, in an embodiment, a login method is provided. Using a server applied to the foregoing application environment as an example, the following steps are included:

Step S210: A first server receives a login request of a first terminal.

Specifically, the first terminal can access the network resource only after logging in. The first terminal receives an input website, generates the login request, and sends the login request to the first server to obtain a two-dimensional code. The first server receives the login request sent by the first terminal.

Step S220: The first server generates a unique identifier according to the login request, stores the unique identifier, generates a corresponding two-dimensional code according to the unique identifier, and returns the corresponding two-dimensional code to the first terminal, the two-dimensional code including the unique identifier.

Specifically, the unique identifier is also referred to as a GUID, which is globally unique and is used for identifying a login process, thereby ensuring that the user name can be bound only to a unique login process, so as to ensure login security. The generated unique identifier is stored in a Redis cache. Redis is a distributed key-value storage system. After the unique identifier is encoded, the two-dimensional code including the unique identifier is generated, and the two-dimensional code is sent to the first terminal.

Step S230: A second server receives the unique identifier that is obtained by a second terminal by scanning the two-dimensional code and a user name that has been used by the second terminal for logging in to an application, and sends the unique identifier and the user name to the first server.

Figure 5:
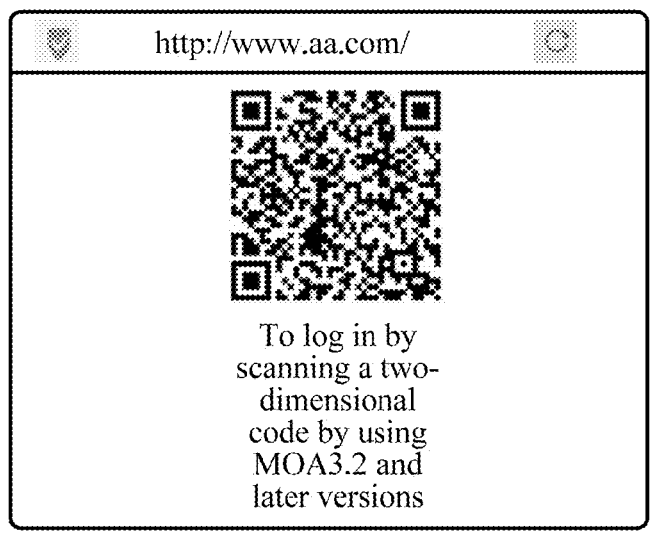
FIG. 5 is a schematic interface diagram of a two-dimensional code displayed on a first terminal according to an embodiment.

Specifically, after receiving the two-dimensional code including the unique identifier, the second server displays the two-dimensional code. A display interface is shown in FIG. 5. The second terminal may scan the two-dimensional code by using a two-dimensional code scanning tool or an application embedded in a two-dimensional code scanning tool, such as an instant messaging application, an enterprise operation application, or a game application. Before scanning the two-dimensional code, the second terminal has logged in to the application by using the user name and a password. The second terminal scans the two-dimensional code in a login state, and obtains, through identification, the unique identifier included in the two-dimensional code. The second terminal generates a binding request including the unique identifier and the user name that has been used for logging in to the application, and sends the binding request to the second server. A system that provides a service by interacting with the application on the second terminal is installed on the second server. The application on the second terminal obtains the service by sending a request to the second server, or the second server may actively provide the service to the application on the second terminal. After receiving the binding request including the unique identifier and the user name that has been used for logging in to the application, the second server forwards the binding request to the first server.

Step S240: The first server performs identity verification of the second server, and if the identity verification of the second server succeeds, enter step S250, or if the identity verification of the second server fails, enter step S260.

Specifically, the second server may send verification information to the first server, and the first server verifies an identity of the second server according to the verification information. The first server and the second server may pre-appoint content of the verification information and a verification manner, for example, a manner in which the verification information includes a particular character string.

Step S250: The first server binds the stored unique identifier to the user name, to implement login to the first terminal by using the user name.

Specifically, after receiving the binding request including the unique identifier and the user name, the first server searches, according to the unique identifier in the binding request, for a same unique identifier stored in the Redis cache, and stores the user name in the binding request and the unique identifier in a binding manner. The unique identifier is used for identifying a login process. Therefore, when the unique identifier is bound to the user name, the login process is in a login state. In an embodiment, the first terminal sends a query request including the unique identifier, so that the first server queries the user name bound to the unique identifier, and logs in according to the user name returned by the first server. In another embodiment, the first server actively notifies the first terminal after binding the unique identifier to the user name, and sends the user name, to implement login to the first terminal by using the user name.

Step S260: The first server rejects the login request.

Specifically, if the identity verification of the second server fails, the second server cannot log in even if the second server has the user name and the unique identifier. Login can be implemented only when a login request sent by a server of which identity verification succeeds is accepted, thereby improving login security.

In this embodiment, a first server receives a login request of a first terminal. The first server generates a unique identifier according to the login request, stores the unique identifier, generates a corresponding two-dimensional code according to the unique identifier, and returns the corresponding two-dimensional code to the first terminal, the two-dimensional code including the unique identifier. The second server receives the unique identifier that is obtained by a second terminal by scanning the two-dimensional code and a user name that has been used by the second terminal for logging in to an application, and sends the unique identifier and the user name to the first server. The first server performs identity verification of the second server. The first server binds the stored unique identifier to the user name only after the identity verification of the second server succeeds, so as to implement login to the first terminal by using the user name. If the identity verification of the second server fails, login cannot be performed. In a login process, the second terminal does not directly perform information interaction with the first server, but performs information interaction by using the second server. Identity verification is performed to the second server. Login can be implemented only when a login request sent by the second server of which the identity verification succeeds is accepted, thereby improving login security. Moreover, information interaction is performed by using the second server. The server has a more powerful computing capability than the terminal and can more rapidly execute a complex algorithm such as encryption or decryption, and is more helpful for troubleshooting. For example, a log is recorded in the server, so that log information is read for troubleshooting, testing and debugging are performed on the server, and performance improvement can be performed on the server. For example, a bottleneck is removed by using a queue or a distributed technology.

Figure 6:
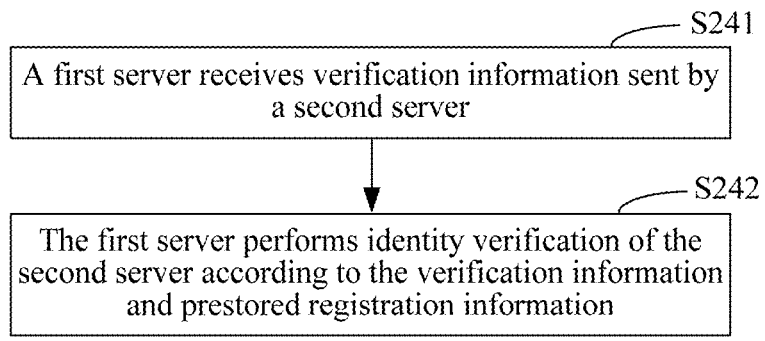
FIG. 6 is a flowchart showing that a first server performs identity verification of a second server according to an embodiment.

In an embodiment, as shown in FIG. 6, step S240 includes:

Step S241: The first server receives verification information sent by the second server.

Specifically, the verification information is used for verifying the identity of the second server. The verification information may include invoking source information, and the invoking source information is information about an invoking party that invokes a login interface, for example, an IP address of the second server. It may be understood that there may be multiple IP addresses. The verification information further includes registration information, where the registration information is registration information obtained and stored by the second server before the second server sends the verification information. The registration information may be used by the second server for multiple times of login interface invocation. The registration information may include a system identifier and a corresponding key. The system identifier and the corresponding key are unique, and the key is used for encrypting a character string. The verification information may further include the encrypted character string generated by using the key in the registration information. Only the second server that is successfully registered can invoke the login interface provided by the first server.

In an embodiment, the verification information, the unique identifier, and the user name are simultaneously sent. For example, the unique identifier and the user name are added to a main body of an HTTP request, the registration information and the encrypted character string in the verification information are added to a header of the HTTP request, and the invoking source information in the verification information is added to an HTTP request packet.

Step S242: The first server performs identity verification of the second server according to the verification information and prestored registration information.

Specifically, the prestored registration information is registration information generated by the first server after the first server receives a registration request, is stored in the first server, and may be sent to an interface server by means of an email or in another manner. The second server obtains the registration information from the interface server, generates verification information by using the registration information, and needs to send the verification information each time a service provided by the first server is invoked. The first server performs identity verification of the second server according to the verification information and the prestored registration information. It may be understood that because the verification information may include various kinds of information such as an IP address and an encrypted character string, the verification succeeds only when verification on all kinds of information succeeds. Login to the first terminal by using the user name can be implemented only when the verification succeeds.

In this embodiment, the verification information is generated by means of an algorithm by using the registration information. The algorithm for generating the verification information may change anytime, thereby avoiding that directly sent registration information is intercepted by a hacker for repeated uses.

In an embodiment, the first server and the second server are both deployed in an enterprise intranet. Transmission in the intranet further ensures security and integrity of a message, and it is more convenient for an enterprise having a higher requirement on security to log in.

Figure 7:
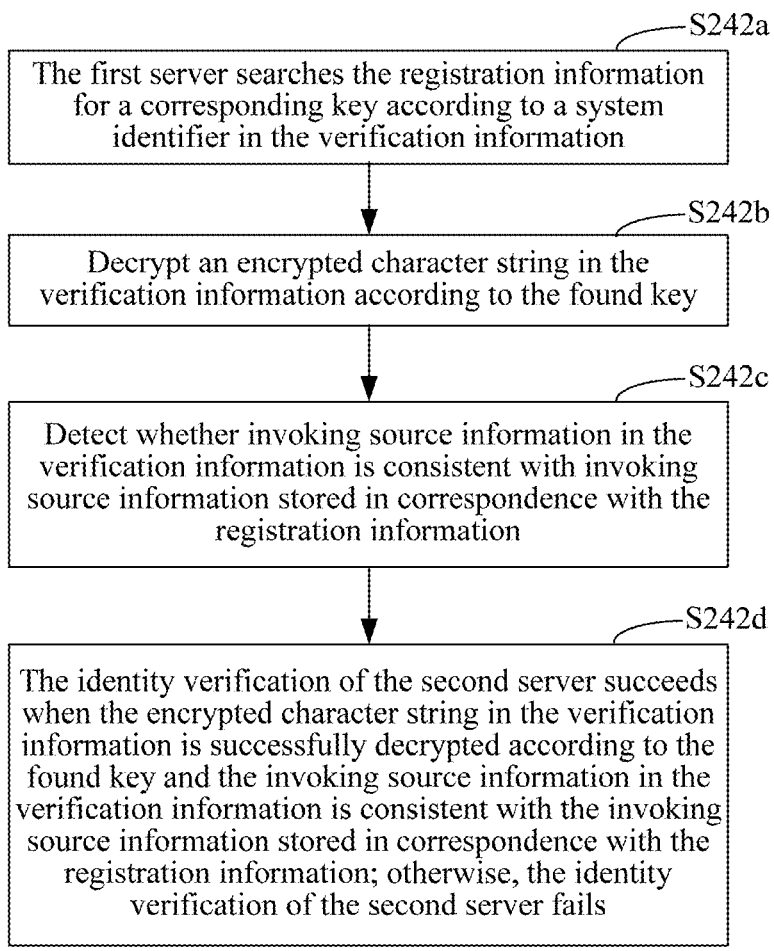
FIG. 7 is a flowchart showing that a first server performs identity verification of a second server according to verification information and prestored registration information according to an embodiment.

In an embodiment, the registration information includes a system identifier and a corresponding key, and the verification information includes a system identifier, an encrypted character string, and corresponding invoking source information. As shown in FIG. 7, step S242 includes:

Step S242a: The first server searches the registration information for a corresponding key according to a system identifier in the verification information.

Specifically, the first server generates the registration information according to the registration request, where the registration request includes the invoking source information; and after generating the registration information, stores the registration information and the invoking source information in correspondence with each other for convenience of subsequent verification work. The registration information includes the system identifier and the corresponding key, where the system identifier and the corresponding key are unique. The verification information includes the system identifier, the encrypted character string, and the corresponding invoking source information. The invoking source information may include the IP address of the server and the like, used for identifying the server. The first server searches the prestored registration information for a system identifier that is the same as the system identifier in the verification information, to obtain the corresponding key.

Step S242b: Decrypt an encrypted character string in the verification information according to the found key.

Specifically, if the system identifier in the verification information is correct, the key corresponding to the encrypted character string may be found, to decrypt the encrypted character string in the verification information.

Step S242c: Detect whether invoking source information in the verification information is consistent with invoking source information stored in correspondence with the registration information.

Specifically, the invoking source information stored in correspondence with the system identifier that is the same as the system identifier in the verification information is found in the registration information, and it is compared whether the found invoking source information is the same as the invoking source information in the verification information.

Step S242d: The identity verification of the second server succeeds when the encrypted character string in the verification information is successfully decrypted according to the found key and the invoking source information in the verification information is consistent with the invoking source information stored in correspondence with the registration information; otherwise, the identity verification of the second server fails.

In this embodiment, only the second server that is successfully registered has the same registration information as the first server. The second server generates the encrypted character string according to the key in the registration information, adds the system identifier, the encrypted character string, and the invoking source information in the registration information to the verification information, and sends the verification information to the first server. The first server prestores same registration information, so that the corresponding key can be found, for decryption, according to the system identifier in the verification information. The invoking source information is stored in correspondence with the registration information. Therefore, the stored invoking source information can be compared with the invoking source information in the verification information. The identity verification of the second server succeeds only when both conditions are satisfied: decryption succeeds and the two pieces of invoking source information are consistent, thereby further improving login security.

In an embodiment, the encrypted character string generated by the second server includes timestamp information. The encrypted character string after decryption further includes timestamp information. Before binding the stored unique identifier to the user name, the first server decrypts the encrypted character string to obtain the timestamp information, determines, according to the timestamp information, whether a preset condition is satisfied, and if the preset condition is satisfied, binds the stored unique identifier to the user name, or if the preset condition is not satisfied, does not bind the stored unique identifier to the user name.

Specifically, a time interval between a timestamp and a current time is calculated. If the time interval exceeds a preset value, the preset condition is not satisfied. In this embodiment, a validity period of the encrypted character string is ensured by using the timestamp. If the time interval exceeds the preset value, the encrypted character string is invalid even if the encrypted character string is successfully decrypted, the stored unique identifier cannot be bound to the user name, and login cannot be implemented. In this way, it is avoided that the encrypted character string is intercepted and repeatedly used, thereby further improving login security.

Figure 8:
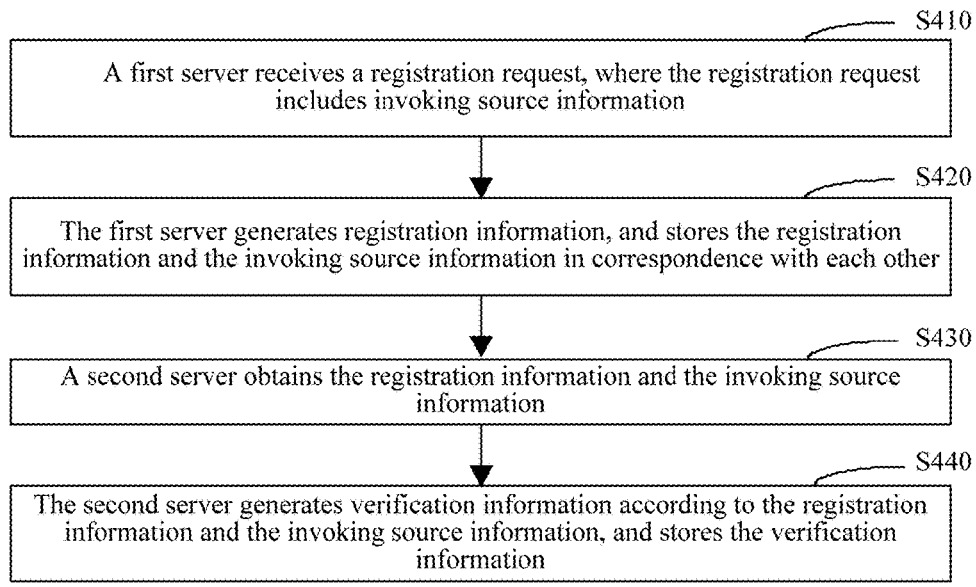
FIG. 8 is a flowchart for generating registration information and generating verification information according to an embodiment.

In an embodiment, as shown in FIG. 8, before step S210, the following steps are further included:

Step S410: A first server receives a registration request, where the registration request includes invoking source information. Specifically, input invoking source information or other to-be-registered information is received by using a web page. A registration request is generated and is sent to the first server. It may be understood that the registration request may be generated on another terminal or server other than a second server.

Step S420: The first server generates registration information, and stores the registration information and the invoking source information in correspondence with each other.

Specifically, the registration information may self-define content according to needs. For example, the registration information includes a system identifier and a corresponding key. The registration information and the invoking source information are stored in correspondence with each other, so that when verifying the second server, the first server searches for the corresponding invoking source information according to the registration information. It may be understood that after being generated, the registration information may be provided to the second server and repeatedly used by the second server when the second server invokes a login interface for multiple times. The registration information needs to be regenerated only when the invoking source information or the like changes.

Step S430: A second server obtains the registration information and the invoking source information.

Specifically, the first server may send the registration information to an interface server in a form of an email. The second server obtains the registration information from the interface server and saves the registration information. Only the server storing the registration information can invoke a login service provided by the first server. When the invoking source information is an IP address, the second server obtains the invoking source information by obtaining an IP address of the second server.

Step S440: The second server generates verification information according to the registration information and the invoking source information, and stores the verification information.

Specifically, data processing may be performed, according to content in the registration information, on a character string whose content is self-defined. For example, the registration information includes a system identifier and a corresponding key. An encrypted character string is obtained according to the key, by using a random number "random" and a timestamp "timestamp" as content, and by using a data encryption standard (DES) encryption algorithm, to generate verification information including the system identifier, the encrypted character string, and the invoking source information, and store the verification information.

Figure 9:
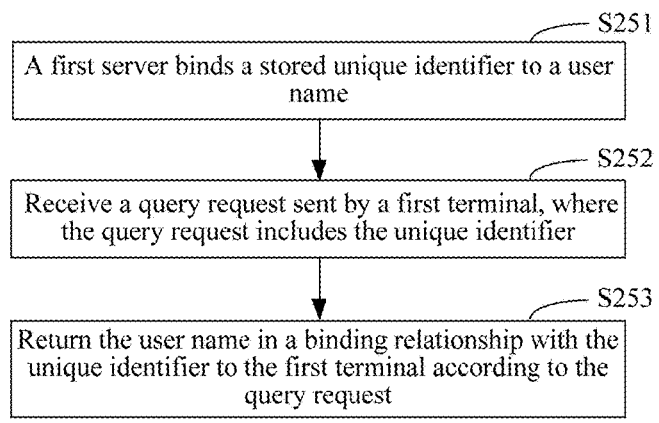
FIG. 9 is a flowchart showing that a first server implements login to a first terminal by using a user name according to an embodiment.

In an embodiment, as shown in FIG. 9, step S250 includes:

Step S251: The first server binds the stored unique identifier to the user name.

Step S252: Receive a query request that is sent by the first terminal and that includes the unique identifier.

Step S253: Return the user name in a binding relationship with the unique identifier to the first terminal according to the query request.

Specifically, the query request includes the unique identifier. When the unique identifier in the query request has a correspondingly bound user name, the user name is returned to the first terminal, so that the first terminal logs in according to the user name.

In an embodiment, a valid time interval is correspondingly stored for the unique identifier. When the valid time interval arrives, the first terminal is caused to stop sending the query request, and delete the unique identifier already stored in the first server. Specifically, if a validity period of a two-dimensional code is five minutes, if login has not been performed within five minutes after a login interface of the first terminal loads the two-dimensional code, the two-dimensional code becomes invalid. Login cannot be performed by using the two-dimensional code, and the first terminal may not continue sending the query request to query a state of the unique identifier. Therefore, a quantity of query requests that are sent by the first terminal may be reduced, thereby reducing working pressure of responding to the query request by the first server, avoiding that an image of the two-dimensional code is saved and maliciously used, and further avoiding that a storage capacity of the first server increases unlimitedly. It may be understood that if the two-dimensional code becomes invalid, the first terminal receives, by sending a login request, a new two-dimensional code generated by the first server.

In an embodiment, after Step S250, the method further includes: generating, by the first server, a ticket according to the user name, returning the ticket to the first terminal, receiving the login request sent by the first terminal, where the login request includes the ticket, verifying, by the first server, the ticket, and if the verification succeeds, implementing login to the first terminal by using the user name in the ticket.

Specifically, the ticket is used for storing identity information of a user. After login succeeds for once, the identity information is stored in the ticket, and the ticket is stored in both a database of the first server and a cookie of a user browser of the first terminal. Next time when the first terminal needs to log in, the first terminal adds the ticket to the login request. After receiving the ticket, the first server performs verification according to the prestored ticket, including verifying a validity period of the ticket or user permissions. If the verification succeeds, the first terminal may log in by using the user name in the ticket. In this embodiment, rapid login is implemented by using the ticket.

Figure 10:
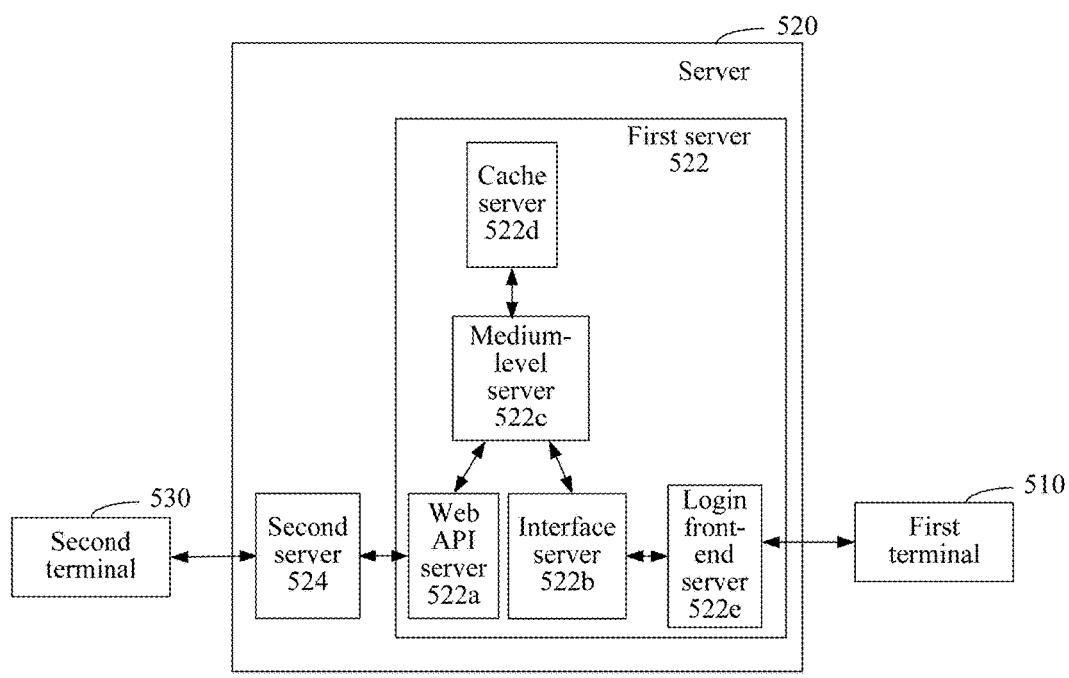
FIG. 10 is an architectural diagram of a login system according to an embodiment.

Specifically, in an embodiment, as shown in FIG. 10, FIG. 10 is a detailed architectural diagram of a system to which a login method in a specific embodiment is applied. The system includes a first terminal 510, a server 520, which includes a first server 522 and a second server 524, and a second terminal 530. In the system, the first server 522 completes the login steps by using multiple servers. The login method completed in this system architecture is specifically: sending, by the first terminal 510, a login request to a login front-end server 522e; forwarding, by the login front-end server 522e, the login request to a medium-level server 522c by using an interface server 522b; generating, by the medium-level server 522c, a unique identifier according to the login request, and storing unique identifier in a cache server 522d; generating, by the medium-level server 522c a corresponding two-dimensional code according to the unique identifier, and returning the corresponding two-dimensional code to the first terminal 510; scanning, by the second terminal 530, the two-dimensional code displayed on the first terminal 510 to obtain the unique identifier, obtaining a user name that has been used for logging in to an application, and sending the unique identifier and the user name to the second server 524; generating, by the second server 524, verification information according to registration information, adding the unique identifier, the user name, and the verification information to a binding request, and sending the binding request to a Web API server 522a; performing, by the Web API server (a web page interface server) 522a, identity verification of the second server 524 according to the verification information and the prestored registration information, and if the verification succeeds, binding, by the medium-level server 522c, the unique identifier stored in the cache server 522d to the user name; and continuously sending, by the first terminal 510, a query request including the unique identifier to the login front-end server 522e, forwarding, by the login front-end server 522e, the query request to the medium-level server 522c by using the interface server 522b, finding, by the medium-level server 522c, whether the unique identifier stored in the cache server 522d has a bound user name, and if yes, returning the user name to the first terminal 510 for login.

Figure 11:
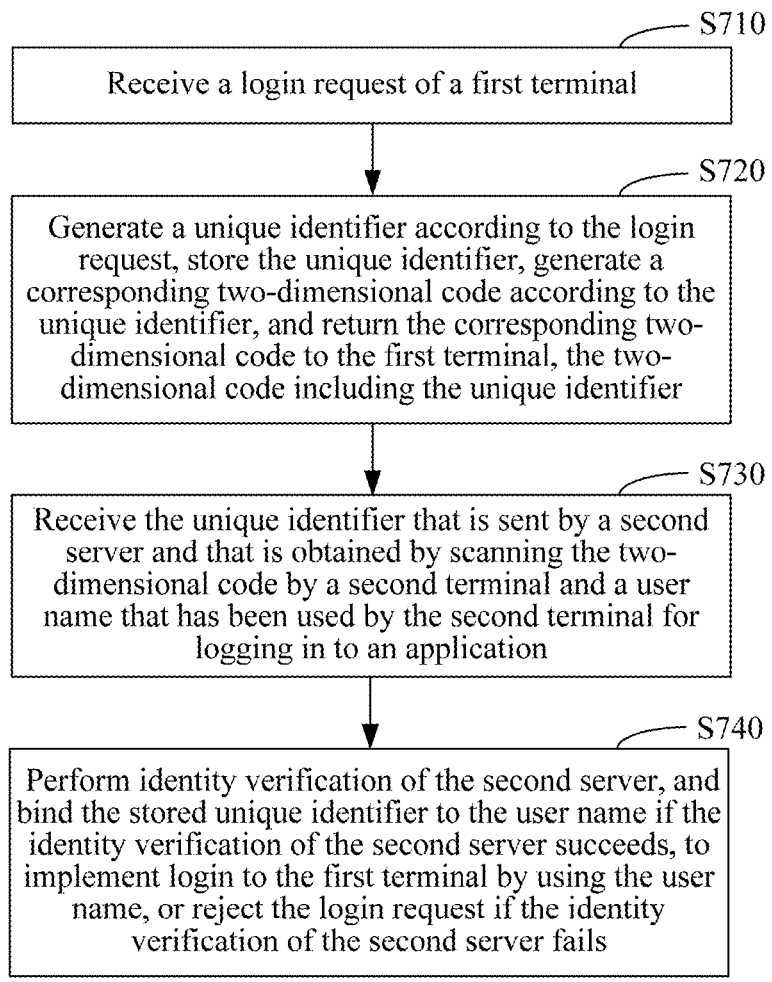
FIG. 11 is a flowchart of a login method according to an embodiment.

In an embodiment, as shown in FIG. 11, a login method is provided, including:

Step S710: Receive a login request of a first terminal.

Step S720: Generate a unique identifier according to the login request, store the unique identifier, generate a corresponding two-dimensional code according to the unique identifier, and return the corresponding two-dimensional code to the first terminal, the two-dimensional code including the unique identifier.

Step S730: Receive the unique identifier that is sent by a second server and that is obtained by scanning the two-dimensional code by a second terminal and a user name that has been used by the second terminal for logging in to an application.

Step S740: Perform identity verification of the second server, and bind the stored unique identifier to the user name if the identity verification of the second server succeeds, to implement login to the first terminal by using the user name, or reject the login request if the identity verification of the second server fails.

In this embodiment, a first server receives a login request of a first terminal, generates a unique identifier according to the login request, and stores the unique identifier, where the unique identifier is used for identifying a login process; generates, according to the unique identifier, a two-dimensional code including the unique identifier, and returns the two-dimensional code to the first terminal; receives the unique identifier that is sent by a second server and that is obtained by scanning the two-dimensional code displayed on the first terminal by a second terminal and a user name that has been used for logging in to an application; and performs identity verification of the second server. If the identity verification of the second server succeeds, the first server binds the stored unique identifier to the user name, which indicates that this login process is in a login state, and returns the user name to the first terminal, to implement login to the first terminal by using the user name. Only a unique identifier and a user name need to be transmitted in a network, thereby reducing transmission of important account information in the network, reducing a risk that the important account information is stolen, and improving login security. Identity verification is performed of a second server. Login can be implemented only when a login request sent by a second server of which identity verification succeeds is accepted, thereby further improving the login security.

In an embodiment, step S740 includes: binding the stored unique identifier to the user name, receiving a query request sent by the first terminal, where the query request includes the unique identifier, and returning the user name in a binding relationship with the unique identifier to the first terminal according to the query request.

Figure 12:
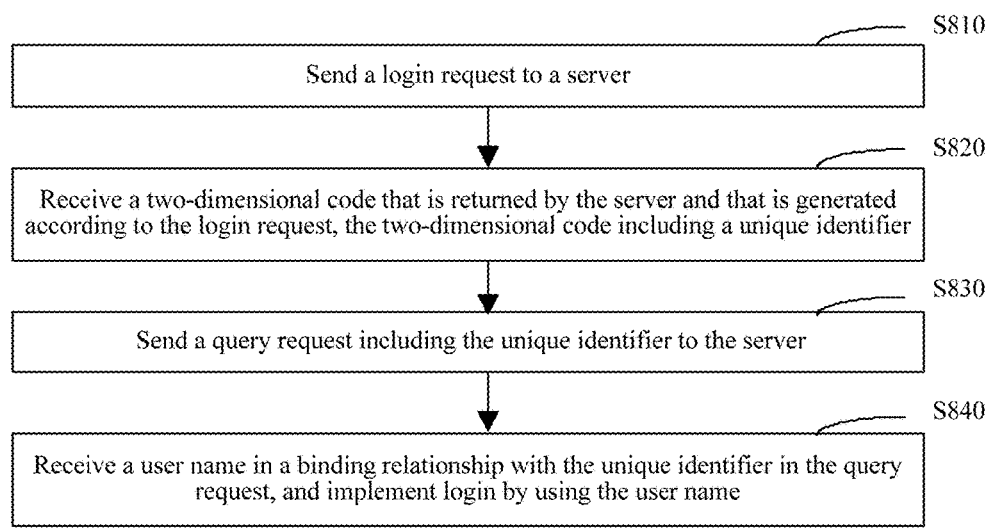
FIG. 12 is a flowchart of a login method according to an embodiment.

In an embodiment, as shown in FIG. 12, a login method is provided, including:

Step S810: Send a login request to a server.

Step S820: Receive a two-dimensional code that is returned by the server and that is generated according to the login request, the two-dimensional code including a unique identifier.

Step S830: Send a query request including the unique identifier to the server.

Step S840: Receive a user name in a binding relationship with the unique identifier in the query request, and implement login by using the user name.

In this embodiment, a terminal sends a login request to a server. The server generates a unique identifier according to the login request, generates a two-dimensional code including the unique identifier, and returns the two-dimensional code to the terminal. The terminal sends a query request including the unique identifier to the server. The server responds to the query request, and when finding a user name in a binding relationship with the unique identifier, the server returns the user name to the terminal. The terminal implements login by using the user name. Only a unique identifier and a user name need to be transmitted in a network, thereby reducing transmission of important account information in the network, reducing a risk that the important account information is stolen, and improving login security.

Figure 13:
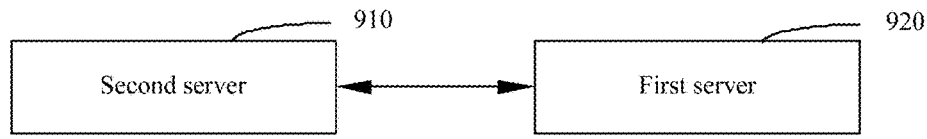
FIG. 13 is a structural block diagram of a login system according to an embodiment.

In an embodiment, as shown in FIG. 13, a login system is provided, including: a first server 910 and a second server 920.

The first server 910 is configured to: receive a login request of a first terminal, generate a unique identifier according to the login request, store the unique identifier, generate a corresponding two-dimensional code according to the unique identifier, and return the corresponding two-dimensional code to the first terminal, the two-dimensional code including the unique identifier.

The second server 920 is configured to: receive the unique identifier that is obtained by a second terminal by scanning the two-dimensional code and a user name that has been used by the second terminal for logging in to an application, and send the unique identifier and the user name to the first server 910.

The first server 910 is further configured to: perform identity verification of the second server 920, and if the identity verification of the second server 920 succeeds, bind the stored unique identifier to the user name, to implement login to the first terminal by using the user name.

The first server 910 is further configured to: if the identity verification of the second server 920 fails, reject the login request.

In an embodiment, the first server 910 is further configured to: receive verification information sent by the second server 920, and perform identity verification of the second server according to the verification information and prestored registration information.

In an embodiment, the registration information includes a system identifier and a corresponding key, and the verification information includes a system identifier, an encrypted character string, and corresponding invoking source information. The first server 910 is further configured to: search the registration information for the corresponding key according to the system identifier in the verification information, decrypt the encrypted character string in the verification information according to the found key, and detect whether the invoking source information in the verification information is consistent with invoking source information stored in correspondence with the registration information. The identity verification of the second server 920 succeeds when the encrypted character string in the verification information is successfully decrypted according to the found key and the invoking source information in the verification information is consistent with the invoking source information stored in correspondence with the registration information; otherwise, the identity verification of the second server 920 fails.

In an embodiment, the first server 910 is further configured to receive a registration request, where the registration request includes invoking source information. The first server 910 is further configured to generate registration information, and store the registration information and the invoking source information in correspondence with each other. The second server 920 is further configured to: obtain the registration information and the invoking source information, generate verification information according to the registration information and the invoking source information, and store the verification information.

In an embodiment, the first server 910 is further configured to: bind the stored unique identifier to the user name, receive a query request that is sent by the first terminal and that includes the unique identifier, and return the user name in a binding relationship with the unique identifier to the first terminal according to the query request.

Figure 14:
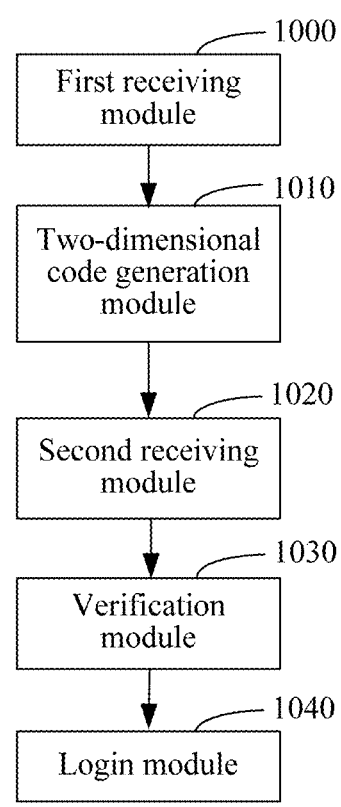
FIG. 14 is a structural block diagram of a first server according to an embodiment.

In an embodiment, as shown in FIG. 14, a first server is provided, including a memory and a processor, where the memory stores instructions. When the instructions are executed by the processor, the first server includes:

a first receiving module 1000, configured to receive a login request of a first terminal;

a two-dimensional code generation module 1010, configured to: generate a unique identifier according to the login request, store the unique identifier, generate a corresponding two-dimensional code according to the unique identifier, and return the corresponding two-dimensional code to the first terminal, the two-dimensional code including the unique identifier;

a second receiving module 1020, configured to receive the unique identifier that is sent by a second server and that is obtained by scanning the two-dimensional code by a second terminal and a user name that has been used by the second terminal for logging in to an application;

a verification module 1030, configured to perform identity verification of the second server, where if the identity verification of the second server succeeds, the login module 1040 is entered; otherwise, the login request is rejected; and a login module 1040, configured to bind the stored unique identifier to the user name, to implement login to the first terminal by using the user name.

In an embodiment, the verification module 1030 is further configured to: receive verification information sent by the second server, and perform identity verification of the second server according to the verification information and prestored registration information.

Figure 15:
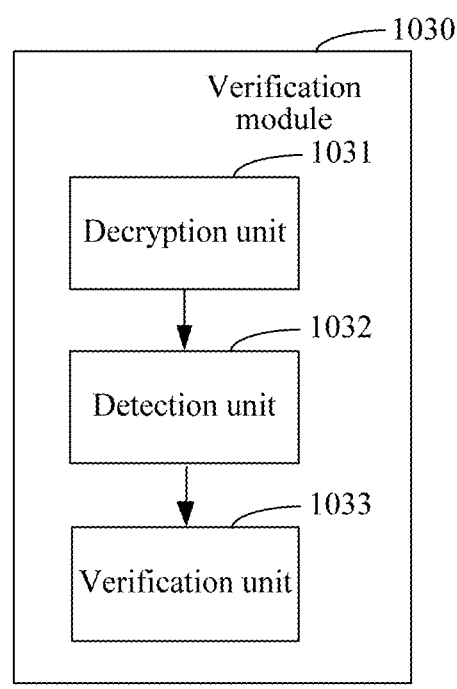
FIG. 15 is a structural block diagram of a verification module according to an embodiment.

In an embodiment, the registration information includes a system identifier and a corresponding key, and the verification information includes a system identifier, an encrypted character string, and corresponding invoking source information. As shown in FIG. 15, the verification module 1030 includes:

a decryption unit 1031, configured to: search the registration information for the corresponding key according to the system identifier in the verification information, and decrypt the encrypted character string in the verification information according to the found key;

a detection unit 1032, configured to detect whether the invoking source information in the verification information is consistent with invoking source information stored in correspondence with the registration information; and a verification unit 1033, configured to: when the encrypted character string in the verification information is successfully decrypted according to the found key, and the invoking source information in the verification information is consistent with the invoking source information stored in correspondence with the registration information, verifies that the identity verification of the second server succeeds; otherwise, verifies that the identity verification of the second server fails.

Figure 16:
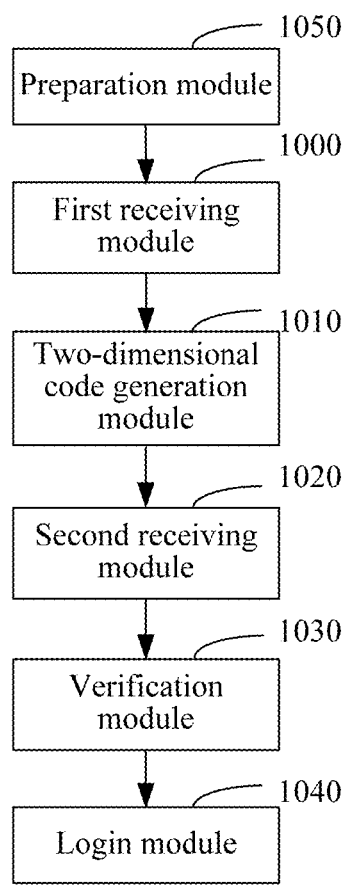
FIG. 16 is a structural block diagram of a first server according to another embodiment.

In an embodiment, as shown in FIG. 16, the first server further includes:

a preparation module 1050, configured to: receive a registration request, where the registration request includes invoking source information, generate registration information, and store the registration information and the invoking source information in correspondence with each other, so that a second server obtains the registration information and the invoking source information, generates verification information according to the registration information and the invoking source information, and stores the verification information.

Figure 17:
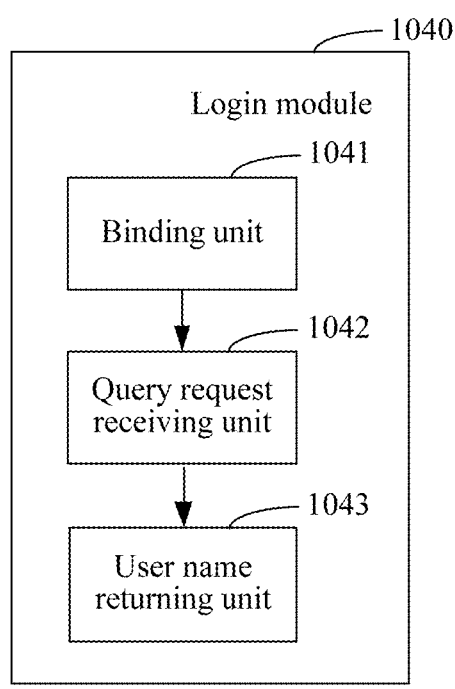
FIG. 17 is a structural block diagram of a login module according to an embodiment.

In an embodiment, as shown in FIG. 17, the login module 1040 includes:

a binding unit 1041, configured to bind the stored unique identifier to the user name;

a query request receiving unit 1042, configured to receive a query request sent by the first terminal, where the query request includes the unique identifier; and a user name returning unit 1043, configured to return the user name in a binding relationship with the unique identifier to the first terminal according to the query request.

Figure 18:
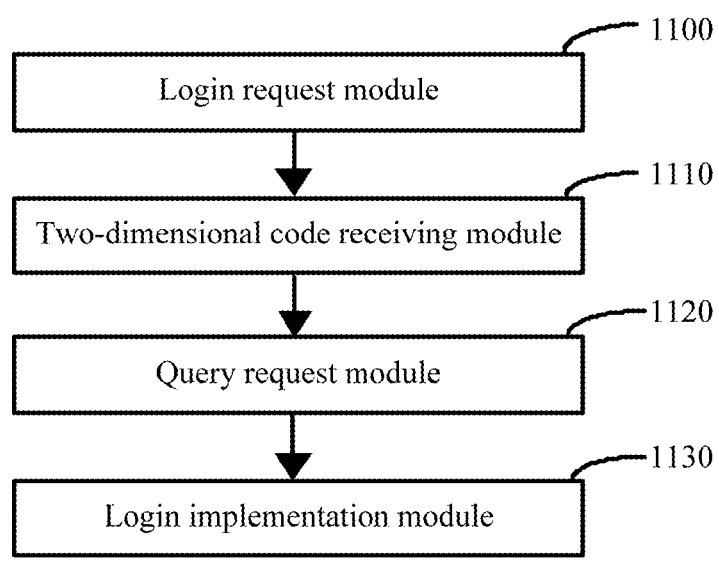
FIG. 18 is a structural block diagram of a terminal according to an embodiment.

In an embodiment, as shown in FIG. 18, a terminal is provided, including a memory and a processor, where the memory stores instructions. When the instructions are executed by the processor, the terminal includes a login request module 1100, configured to sending a login request to a server;

a two-dimensional code receiving module 1110, configured to receive a two-dimensional code that is returned by the server and that is generated according to the login request, the two-dimensional code including a unique identifier;

a query request module 1120, configured to send a query request including the unique identifier to the server; and a login implementation module 1130, configured to: receive a user name in a binding relationship with the unique identifier in the query request, and implement login by using the user name.

A person of ordinary skill in the art may understand that all or some of procedures of the methods in the foregoing embodiments may be implemented by a computer program instructing relevant hardware. The program may be stored in a computer readable storage medium. For example, in the embodiments of the present invention, the program may be stored in a storage medium of a computer system, and is executed by at least one processor in the computer system, to implement for example, procedures of the embodiments of the foregoing methods. The foregoing storage medium may be a magnetic disk, an optical disc, a read-only memory (ROM), a random access memory (RAM), or the like.

Technical features of the foregoing embodiments may be arbitrarily combined. For brevity of description, not all possible combinations of the technical features in the foregoing embodiments are described. However, the combinations of these technical features shall be considered to fall within the scope recorded in this specification as long as the combinations have no conflict.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the concept of the present disclosure, and these all fall within the protection scope of the present disclosure. Therefore, the patent protection scope of the present disclosure should be subject to the appended claims.

What is claimed is:

1. A login method, comprising:
    receiving, by a first server, a registration request, wherein the registration request comprises invoking source information of a second server, the invoking source information comprising an IP address of the second server;
    receiving, by the first server, a login request of a first terminal;
    generating, by the first server, a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;
    receiving, by the first server, the unique identifier and a user name sent by the second server, wherein the second server receives the unique identifier that is obtained by a second terminal by scanning the corresponding two-dimensional code on the first terminal and wherein the user name has been used by the second terminal for logging in to an application;
    performing, by the first server, identity verification of the second server;
    when the identity verification of the second server succeeds, binding, by the first server, the unique identifier stored on the first server to the user name to implement login of the first terminal by using the user name; and
    when the identity verification of the second server fails, rejecting, by the first server, the login request.

2. The method according to claim 1, wherein the performing, by the first server, the identity verification of the second server comprises:
    receiving, by the first server, verification information sent by the second server; and
    performing, by the first server, the identity verification of the second server according to the verification information and prestored registration information.

3. The method according to claim 1, wherein before the receiving, by the first server, the login request of the first terminal, the method further comprises:
    generating, by the first server, registration information, and storing the registration information and the invoking source information in correspondence with each other, so that the second server obtains the registration information and the invoking source information, generates verification information according to the registration information and the invoking source information, and stores the verification information.

4. The method according to claim 1, wherein, when the identity verification of the second server succeeds, the binding, by the first server, the unique identifier stored on the first server to the user name to implement login of the first terminal by using the user name comprises:
    binding, by the first server, the unique identifier to the user name;
    receiving a query request sent by the first terminal, wherein the query request comprises the unique identifier; and
    returning the user name in a binding relationship with the unique identifier to the first terminal according to the query request.

5. A login method, comprising:
    receiving, by a first server, a login request of a first terminal;
    generating, by the first server, a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;
    receiving, by the first server, the unique identifier and a user name sent by a second server, wherein the second server receives the unique identifier that is obtained by a second terminal by scanning the corresponding two-dimensional code on the first terminal and wherein the user name has been used by the second terminal for logging in to an application;
    performing, by the first server, identity verification of the second server;
    when the identity verification of the second server succeeds, binding, by the first server, the unique identifier stored on the first server to the user name to implement login of the first terminal by using the user name; and
    when the identity verification of the second server fails, rejecting, by the first server, the login request;
    wherein the performing, by the first server, the identity verification of the second server comprises:

receiving, by the first server, verification information sent by the second server, and performing, by the first server, the identity verification of the second server according to the verification information and prestored registration information; and wherein:

the prestored registration information comprises a system identifier and a corresponding key, and the verification information comprises a system identifier, an encrypted character string, and corresponding invoking source information, and the performing, by the first server, the identity verification of the second server according to the verification information and the prestored registration information comprises:

searching, by the first server, the prestored registration information for the corresponding key in the prestored registration information according to the system identifier in the verification information, decrypting the encrypted character string in the verification information according to the corresponding key in the prestored registration information, and detecting whether the corresponding invoking source information in the verification information is consistent with invoking source information stored in correspondence with the prestored registration information, wherein the identity verification of the second server succeeds when the encrypted character string in the verification information is successfully decrypted according to the corresponding key and the corresponding invoking source information in the verification information is consistent with the invoking source information stored in correspondence with the prestored registration information, and the identity verification of the second server fails when either the encrypted character string in the verification information is not successfully decrypted according to the corresponding key or the corresponding invoking source information in the verification information is not consistent with the invoking source information stored in correspondence with the prestored registration information.

6. A first server, comprising:

a memory storing instructions;

at least one processor in communication with the memory, wherein, when the instructions are executed by the at least one processor, the at least one processor is configured to cause the first server to perform:

receiving a registration request, wherein the registration request comprises invoking source information of a second server, the invoking source information comprising an IP address of the second server; and receiving a login request of a first terminal;

generating a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;

receiving the unique identifier and a user name sent by the second server, wherein the unique identifier is obtained by scanning the corresponding two-dimensional code on the first terminal by a second terminal and wherein the user name has been used by the second terminal for logging in to an application;

performing identity verification of the second server;

when the identity verification of the second server succeeds, binding the unique identifier stored in the first server to the user name to implement login of the first terminal by using the user name; and when the identity verification of the second server fails, rejecting the login request.

7. The first server according to claim 6, wherein, when the at least one processor is configured to cause the first server to perform the performing the identity verification of the second server, the at least one processor is configured to cause the first server to perform:

receiving verification information sent by the second server; and performing the identity verification of the second server according to the verification information and prestored registration information.

8. The first server according to claim 6, wherein when the instructions are executed by the at least one processor, the at least one processor is configured to further cause the first server to perform:

generating registration information, and storing the registration information and the invoking source information in correspondence with each other, so that the second server obtains the registration information and the invoking source information, generates verification information according to the registration information and the invoking source information, and stores the verification information.

9. The first server according to claim 6, wherein, when the at least one processor is configured to cause the first server to perform the binding the unique identifier stored in the first server to the user name to implement login of the first terminal by using the user name, the at least one processor is configured to cause the first server to perform:

binding the unique identifier to the user name;

receiving a query request sent by the first terminal, wherein the query request comprises the unique identifier; and returning the user name in a binding relationship with the unique identifier to the first terminal according to the query request.

10. A first server, comprising:

a memory storing instructions;

at least one processor in communication with the memory, wherein, when the instructions are executed by the at least one processor, the at least one processor is configured to cause the first server to perform:

receiving a login request of a first terminal;

generating a unique identifier according to the login request, storing the unique identifier, generating a corresponding two-dimensional code according to the unique identifier, and returning the corresponding two-dimensional code to the first terminal, wherein the corresponding two-dimensional code comprises the unique identifier;

receiving the unique identifier and a user name sent by a second server, wherein the unique identifier is obtained by scanning the corresponding two-dimensional code on the first terminal by a second terminal and wherein the user name has been used by the second terminal for logging in to an application;

performing identity verification of the second server;

when the identity verification of the second server succeeds, binding the unique identifier stored in the first server to the user name to implement login of the first terminal by using the user name; and when the identity verification of the second server fails, rejecting the login request;

wherein, when the at least one processor is configured to cause the first server to perform the performing the identity verification of the second server, the at least one processor is configured to cause the first server to perform:

receiving verification information sent by the second server; and performing the identity verification of the second server according to the verification information and prestored registration information; and wherein:

the prestored registration information comprises a system identifier and a corresponding key, and the verification information comprises a system identifier, an encrypted character string, and corresponding invoking source information; and when the at least one processor is configured to cause the first server to perform the performing the identity verification of the second server according to the verification information and the prestored registration information, the at least one processor is configured to cause the first server to perform:

searching the prestored registration information for the corresponding key in the prestored registration information according to the system identifier in the verification information;

decrypting the encrypted character string in the verification information according to the corresponding key in the prestored registration information; and detecting whether the corresponding invoking source information in the verification information is consistent with invoking source information stored in correspondence with the prestored registration information, wherein the identity verification of the second server succeeds when the encrypted character string in the verification information is successfully decrypted according to the corresponding key and the corresponding invoking source information in the verification information is consistent with the invoking source information stored in correspondence with the prestored registration information, and the identity verification of the second server fails when either the encrypted character string in the verification information is not successfully decrypted according to the corresponding key or the corresponding invoking source information in the verification information is not consistent with the invoking source information stored in correspondence with the prestored registration information.

11. A login system, comprising:

a first server, comprising:

a first memory storing first instructions, and first at least one processor in communication with the first memory, wherein, when the first at least one processor executes the first instructions, the first at least one processor is configured to cause the first server to: receive a registration request, wherein the registration request comprises invoking source information comprising an IP address of a second server, receive a login request of a first terminal, generate a unique identifier according to the login request, store the unique identifier, generate a corresponding two-dimensional code according to the unique identifier, and return the corresponding two-dimensional code to the first terminal, the corresponding two-dimensional code comprising the unique identifier; and the second server, comprising:

a second memory storing second instructions, and second at least one processor in communication with the second memory, wherein, when the second at least one processor executes the second instructions, the second at least one processor is configured to cause the second server to: receive the unique identifier that is obtained by a second terminal by scanning the corresponding two-dimensional code and a user name that has been used by the second terminal for logging in to an application, and send the unique identifier and the user name to the first server, wherein when the first at least one processor executes the first instructions, the first at least one processor is configured to further cause the first server to:

perform identity verification of the second server, when the identity verification of the second server succeeds, bind the unique identifier stored in the first server to the user name to implement login of the first terminal by using the user name, and when the identity verification of the second server fails, reject the login request.

12. The system according to claim 11, wherein, when the first at least one processor is configured to cause the first server to perform the identity verification of the second server, the first at least one processor is configured to cause the first server to: receive verification information sent by the second server, and perform the identity verification of the second server according to the verification information and prestored registration information.

13. The system according to claim 11, wherein:

when the first at least one processor executes the first instructions, the first at least one processor is configured to further cause the first server to:

generate registration information, and store the registration information and the invoking source information in correspondence with each other; and when the second at least one processor executes the second instructions, the second at least one processor is configured to further cause the second server to:

obtain the registration information and the invoking source information, generate verification information according to the registration information and the invoking source information, and store the verification information.

14. The system according to claim 11, wherein, when the first at least one processor is configured to cause the first server to bind the unique identifier stored in the first server to the user name to implement login of the first terminal by using the user name, the first at least one processor is configured to cause the first server to:

bind the unique identifier to the user name;

receive a query request sent by the first terminal, wherein the query request comprises the unique identifier; and return the user name in a binding relationship with the unique identifier to the first terminal according to the query request.

15. A login system, comprising:
a first server, comprising:
- a first memory storing first instructions, and
- first at least one processor in communication with the first memory, wherein, when the first at least one processor executes the first instructions, the first at least one processor is configured to cause the first server to: receive a login request of a first terminal, generate a unique identifier according to the login request, store the unique identifier, generate a corresponding two-dimensional code according to the unique identifier, and return the corresponding two-dimensional code to the first terminal, the corresponding two-dimensional code comprising the unique identifier; and a second server, comprising:
- a second memory storing second instructions, and
- second at least one processor in communication with the second memory, wherein, when the second at least one processor executes the second instructions, the second at least one processor is configured to cause the second server to: receive the unique identifier that is obtained by a second terminal by scanning the corresponding two-dimensional code and a user name that has been used by the second terminal for logging in to an application, and send the unique identifier and the user name to the first server, wherein when the first at least one processor executes the first instructions, the first at least one processor is configured to further cause the first server to:
- perform identity verification of the second server,
- when the identity verification of the second server succeeds, bind the unique identifier stored in the first server to the user name to implement login of the first terminal by using the user name, and
- when the identity verification of the second server fails, reject the login request;

wherein, when the first at least one processor is configured to cause the first server to perform the identity verification of the second server, the first at least one processor is configured to cause the first server to: receive verification information sent by the second server, and perform the identity verification of the second server according to the verification information and prestored registration information; and wherein:
the prestored registration information comprises a system identifier and a corresponding key, and the verification information comprises a system identifier, an encrypted character string, and corresponding invoking source information; and when the first at least one processor is configured to cause the first server to perform the identity verification of the second server according to the verification information and the prestored registration information, the first at least one processor is configured to cause the first server to:
- search the prestored registration information for the corresponding key according to the system identifier in the verification information,
- decrypt the encrypted character string in the verification information according to the corresponding key, and
- detect whether the corresponding invoking source information in the verification information is consistent with invoking source information stored in correspondence with the registration information, wherein
  - the identity verification of the second server succeeds when the encrypted character string in the verification information is successfully decrypted according to the corresponding key and the corresponding invoking source information in the verification information is consistent with the invoking source information stored in correspondence with the prestored registration information, and
  - the identity verification of the second server fails when either the encrypted character string in the verification information is not successfully decrypted according to the corresponding key or the corresponding invoking source information in the verification information is not consistent with the invoking source information stored in correspondence with the prestored registration information.

* * * * *